US012560486B2

(12) United States Patent
Wang et al.

(10) Patent No.: US 12,560,486 B2
(45) Date of Patent: Feb. 24, 2026

(54) DEVICES AND METHODS FOR TEMPERATURE MEASUREMENT

(71) Applicant: ZHEJIANG PIXFRA TECHNOLOGY CO., LTD., Zhejiang (CN)

(72) Inventors: Xiaonan Wang, HangZhou (CN); Lingrui Kong, Hangzhou (CN); Fei Xue, Hangzhou (CN)

(73) Assignee: ZHEJIANG PIXFRA TECHNOLOGY CO., LTD., Hangzhou (CN)

(*) Notice: Subject to any disclaimer, the term of this patent is extended or adjusted under 35 U.S.C. 154(b) by 397 days.

(21) Appl. No.: 18/176,436

(22) Filed: Feb. 28, 2023

(65) Prior Publication Data

US 2023/0204429 A1 Jun. 29, 2023

Related U.S. Application Data

(63) Continuation of application No. PCT/CN2021/128370, filed on Nov. 3, 2021.

(30) Foreign Application Priority Data

Dec. 9, 2020 (CN) .......................... 202011445541.7

(51) Int. Cl.
 *G01J 5/80* (2022.01)
 *G01J 5/00* (2022.01)
  (Continued)

(52) U.S. Cl.
 CPC ............... *G01J 5/80* (2022.01); *G01J 5/0859* (2013.01); *G06N 3/09* (2023.01); *G06V 40/165* (2022.01); *G01J 2005/0077* (2013.01)

(58) Field of Classification Search
 CPC .... G01J 5/80; G01J 5/0859; G01J 2005/0077; G06V 40/165
 See application file for complete search history.

(56) References Cited

U.S. PATENT DOCUMENTS 6,112,423 A * 9/2000 Sheehan ................ G01C 25/00
 33/502
2013/0306851 A1* 11/2013 Le Noc et al. ........... G01J 5/02
 250/252.1
(Continued)

FOREIGN PATENT DOCUMENTS

CN 1821732 A 8/2006
CN 103424192 B 10/2015
(Continued)

OTHER PUBLICATIONS

International Search Report in PCT/CN2021/128370 mailed on Jan. 12, 2022, 5 pages.
(Continued)

*Primary Examiner* — John E Breene
(74) *Attorney, Agent, or Firm* — METIS IP LLC

(57) ABSTRACT

A device for temperature measurement, includes a black-body configured to radiate a specified temperature, an infra-red thermal imaging camera configured to measure a temperature of a target surface of the blackbody and a temperature of an object and at least one processor config-ured to calibrate the temperature of the object based on the specified temperature and the temperature of the target surface.

18 Claims, 7 Drawing Sheets

300

(51) Int. Cl.

| | |
|---|---|
| *G01J 5/08* | (2022.01) |
| *G06N 3/09* | (2023.01) |
| *G06V 40/16* | (2022.01) |

(56) References Cited

U.S. PATENT DOCUMENTS

| | | | |
|---|---|---|---|
| 2017/0284869 A1* | 10/2017 | Dubbs et al. | ........... G01J 5/505 |
| 2021/0285823 A1 | 9/2021 | Gao | |
| 2022/0227059 A1* | 7/2022 | Borras Camarasa et al. | ............... B29C 64/393 |
| 2023/0075679 A1* | 3/2023 | Zhang et al. | ............. G01J 5/53 |

FOREIGN PATENT DOCUMENTS

| | | |
|---|---|---|
| CN | 107741276 A | 2/2018 |
| CN | 109870239 A | 6/2018 |
| CN | 207515910 U | 6/2018 |
| CN | 110108364 A | 8/2018 |
| CN | 108562363 A | 9/2018 |
| CN | 110332995 A | 10/2019 |
| CN | 110411570 A | 11/2019 |
| CN | 110726475 A | 1/2020 |
| CN | 110823381 A | 2/2020 |
| CN | 211452611 U | 9/2020 |
| CN | 211477416 U | 9/2020 |
| CN | 111751006 A | 10/2020 |
| CN | 112033545 A | 12/2020 |
| CN | 112161711 A | 1/2021 |
| JP | 2001349786 A | 12/2001 |
| WO | 2021262281 A1 | 12/2021 |
| WO | 2022121562 A1 | 8/2022 |

OTHER PUBLICATIONS

Written Opinion in PCT/CN2021/128370 mailed on Jan. 12, 2022, 7 pages.

First Office Action in Chinese Application No. 202011445541.7 mailed on Dec. 17, 2021, 19 pages.

The Extended European Search Report in European Application No. 21902269.6 mailed on Dec. 5, 2023, 9 pages.

\* cited by examiner

100

<u>200</u>
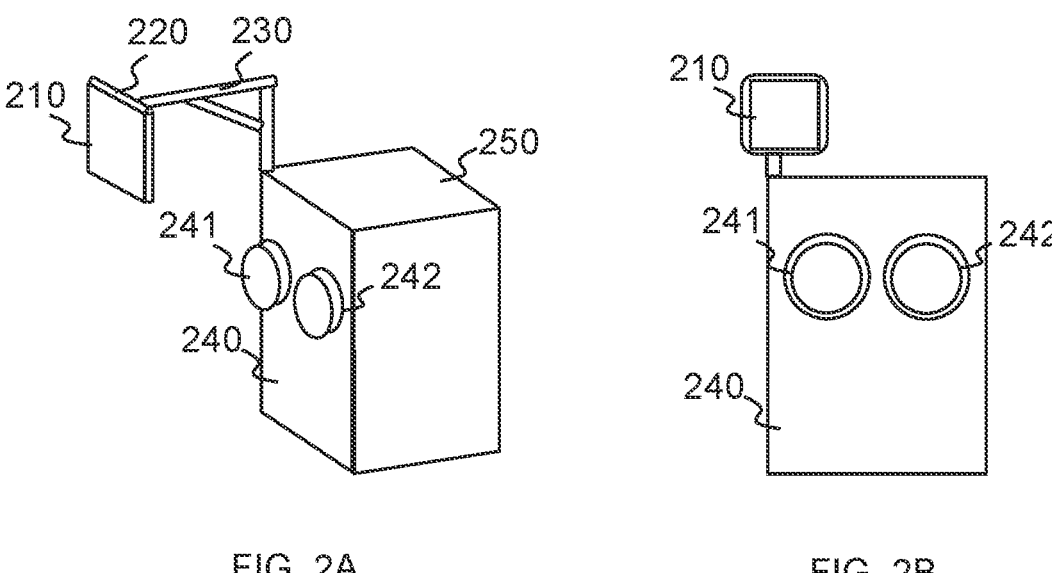
FIG. 2A                                    FIG. 2B
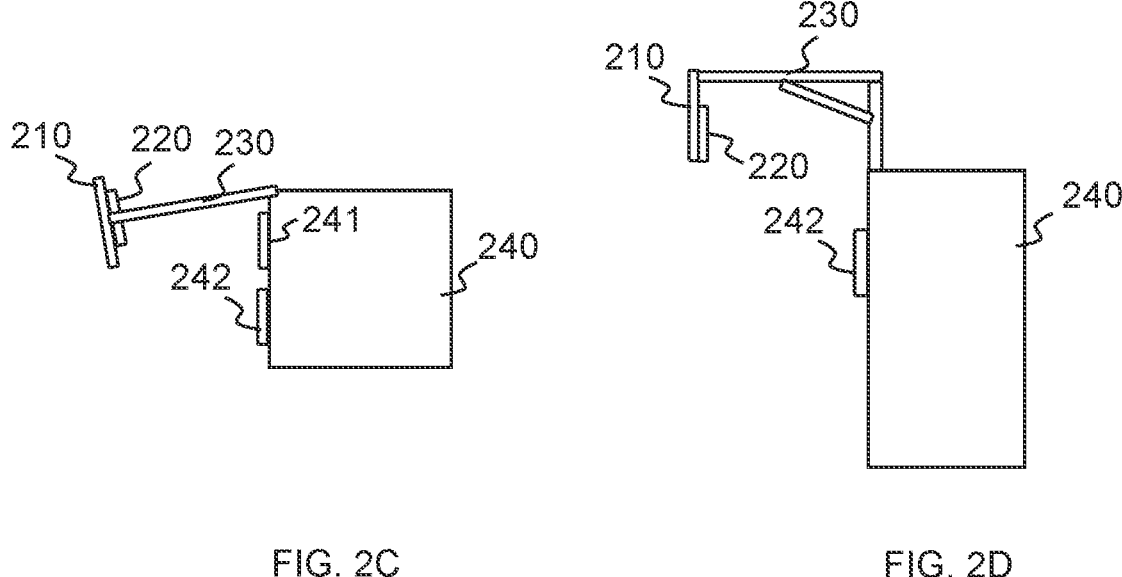
FIG. 2C                                    FIG. 2D

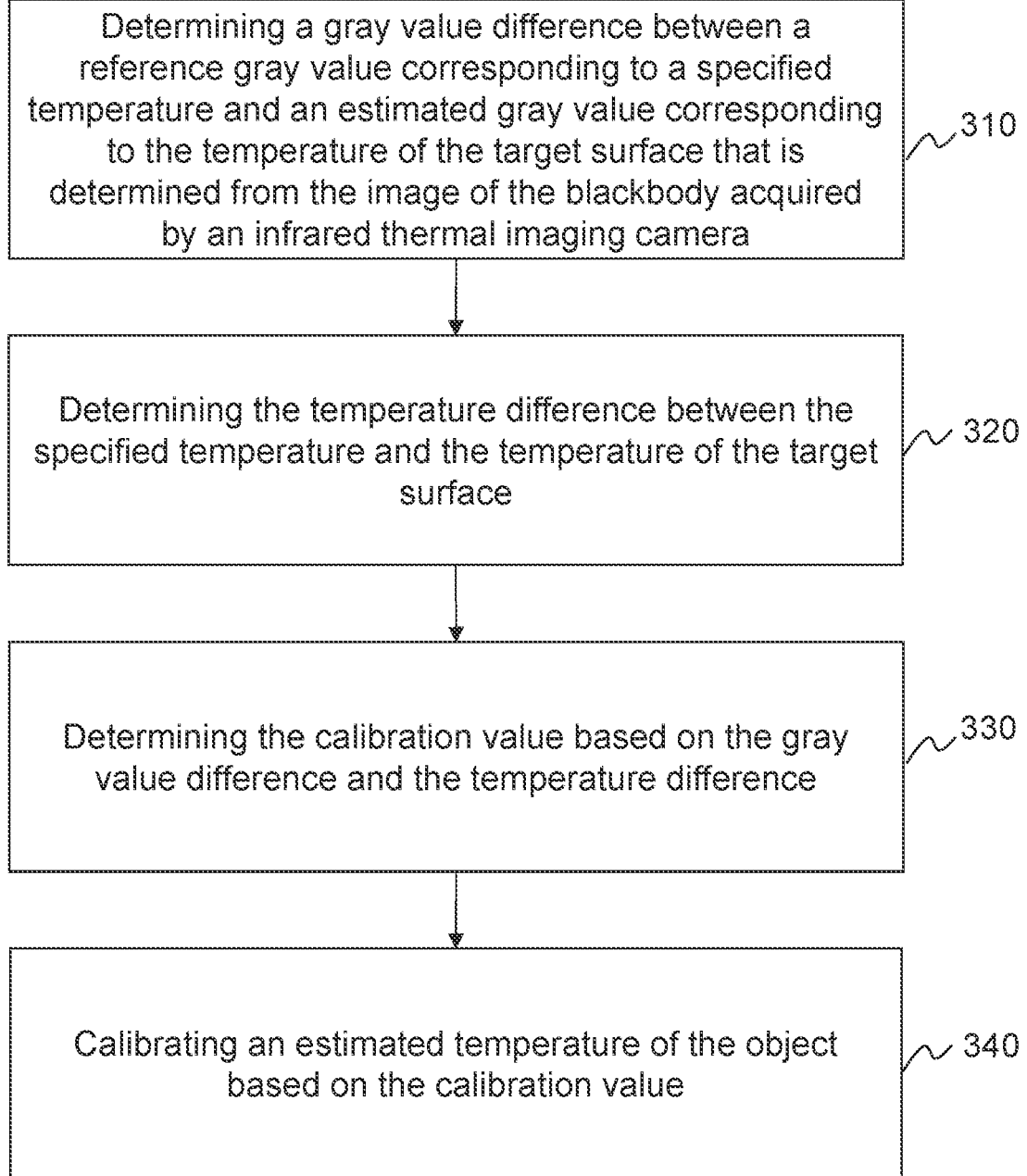

300

Determining a gray value difference between a reference gray value corresponding to a specified temperature and an estimated gray value corresponding to the temperature of the target surface that is determined from the image of the blackbody acquired by an infrared thermal imaging camera ⟿310

Determining the temperature difference between the specified temperature and the temperature of the target surface ⟿ 320

Determining the calibration value based on the gray value difference and the temperature difference ⟿330

Calibrating an estimated temperature of the object based on the calibration value ⟿ 340

FIG. 3

<u>400</u>
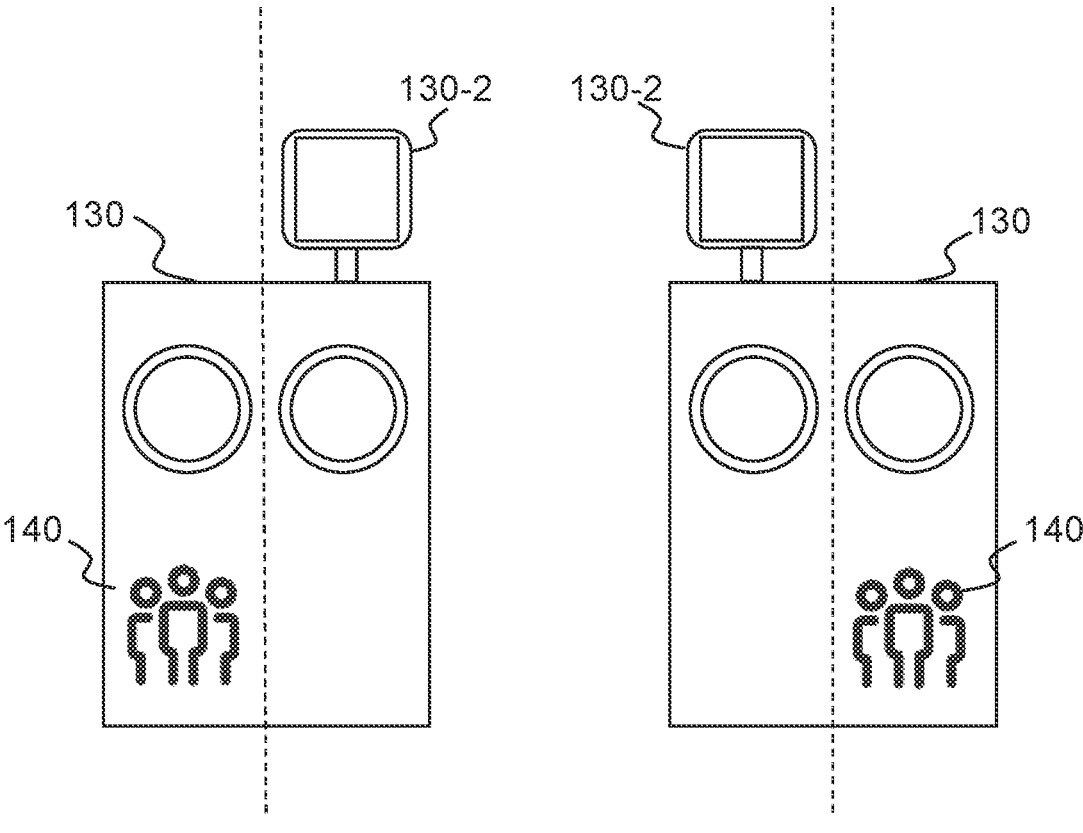
FIG. 4A                    FIG. 4B

<u>500</u>

| Reference temperature (℃) | Gray value difference |
|---|---|
| -30 | 0 |
| -20 | $G_{-20}$ |
| -10 | $G_{-10}$ |
| 0 | $G_0$ |
| 10 | $G_{10}$ |
| 20 | $G_{20}$ |
| 30 | $G_{30}$ |
| 40 | $G_{40}$ |
| 50 | $G_{50}$ |
| 60 | $G_{60}$ |
| 70 | $G_{70}$ |

FIG. 7A

| Reference temperature (℃) | Gray value difference |
|---|---|
| -30 | 0 |
| -20 | 103 |
| -10 | 161 |
| 0 | 218 |
| 10 | 276 |
| 20 | 334 |
| 30 | 391 |
| 40 | 448 |
| 50 | 495 |
| 60 | 543 |
| 70 | 590 |

FIG. 7B

| Reference temperature (℃) | Gray value difference |
|---|---|
| -30 | 0 |
| -20 | 111.96 |
| -10 | 169.96 |
| 0 | 226.96 |
| 10 | 284.96 |
| 20 | 342.96 |
| 30 | 399.96 |
| 40 | 456.96 |
| 50 | 503.96 |
| 60 | 551.96 |
| 70 | 598.96 |

FIG. 7C

DEVICES AND METHODS FOR TEMPERATURE MEASUREMENT

CROSS-REFERENCE TO RELATED APPLICATION

This application is a Continuation of International Application No. PCT/CN2021/128370 filed on Nov. 3, 2021, which claims priority of Chinese Patent Application No. 202011445541.7, filed on Dec. 9, 2020, the contents of which are entirely incorporated herein by reference.

TECHNICAL FIELD

The present disclosure generally relates to temperature measurement field, and in particular, to methods and devices for temperature measurement.

BACKGROUND

With the rapid development of science and technology, an infrared thermal imaging device is used in various industries. Using a non-contact infrared thermal imaging device to measure the temperature of a human body has an important impact in the fields of medical treatment, epidemic prevention, national defense, etc. The infrared thermal imaging device may measure the temperature of an object by using a detector to detect an infrared signal generated by the thermal radiation of the subject, converting the infrared signal into an image, and display the temperature value through calculation. Therefore, the temperature measurement using the infrared thermal imaging device is greatly affected by the ambient temperature and the temperature of the infrared thermal imaging device.

Thus, it is desirable to develop effective devices and methods for temperature measurement with improved accuracy to reduce the measurement error.

SUMMARY

According to some embodiments of the present disclosure, a device for measuring a temperature is provided. The device includes: a blackbody configured to radiate a specified temperature, an infrared thermal imaging camera configured to measure a temperature of a target surface of the blackbody and a temperature of an object and at least one processor configured to calibrate the temperature of the object based on the specified temperature and the temperature of the target surface.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 1 is a schematic diagram illustrating an exemplary temperature measurement system according to some embodiments of the present disclosure;

FIG. 2A is a schematic diagram illustrating exemplary device for temperature measurement according to some embodiments of the present disclosure;

FIG. 2B is a front view illustrating exemplary device for temperature measurement according to some embodiments of the present disclosure;

FIG. 2C is a vertical view illustrating exemplary device for temperature measurement according to some embodiments of the present disclosure;

FIG. 2D is a right-side view illustrating exemplary device for temperature measurement according to some embodiments of the present disclosure;

FIG. 3 is a flowchart illustrating an exemplary process for measuring the temperature according to some embodiments of the present disclosure;

FIGS. 4A-B are schematic diagrams of moving a black body according to some embodiments of the present disclosure;

FIGS. 7A-C are schematic diagrams illustrating exemplary relationships between a reference temperature and a gray value difference according to some embodiments of the present disclosure.

DETAILED DESCRIPTION

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is to describe example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Figure 1:
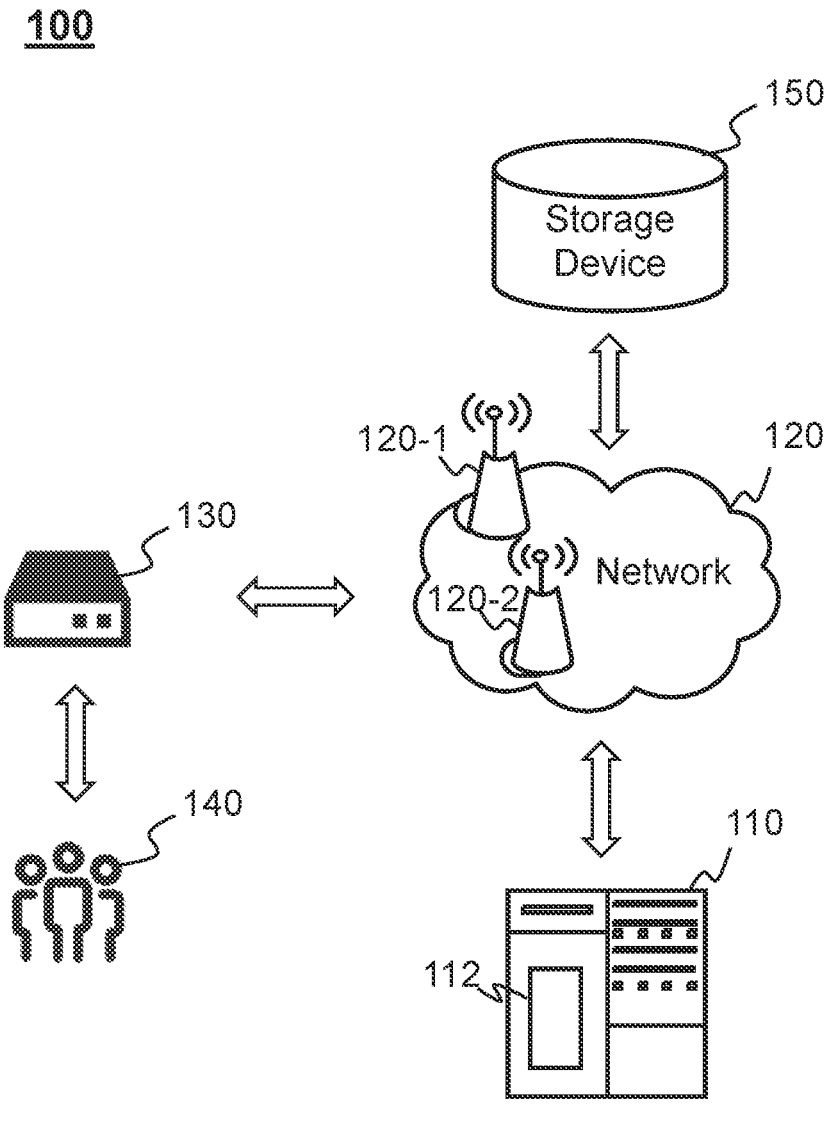
FIG. 1 is a schematic diagram illustrating an application scenario of a signal analysis system.

FIG. 1 is a schematic diagram illustrating an exemplary temperature measurement system according to some embodiments of the present disclosure. The temperature measurement system 100 may include a server 110, a network 120, a device for temperature measurement 130 (also referred to as a temperature measurement device), one or more objects 140, and a storage device 150.

The temperature measurement system 100 may provide a plurality of services. Exemplary services may include a temperature measurement service, a temperature calibration service, etc.

In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the device for temperature measurement 130, and/or the storage device 150 via the network 120. As another example, the server 110 may be directly connected to the device for temperature measurement 130, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the server 110 may include a processing device 112. The processing device 112 may process information and/or data related to temperature measurement to perform one or more functions described in the present disclosure. For example, the processing device 112 may measure the temperature of an object (e.g., a human body). As another example, the processing device 112 may calibrate the temperature of the object to obtain a target temperature of the object. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof. In some embodiments, the processing device 112 may be integrated into the device for temperature measurement 130.

The network 120 may facilitate exchange of information and/or data. In some embodiments, one or more components of the temperature measurement system 100 (e.g., the server 110, the device for temperature measurement 130, and the storage device 150) may transmit information and/or data to other component(s) of the temperature measurement system 100 via the network 120. For example, the server 110 may receive a measured temperature from the device 30 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the temperature measurement system 100 may be connected to the network 120 to exchange data and/or information.

The device for temperature measurement 130 may be configured to measure the temperature. In some embodiments, the device for temperature measurement 130 may include a temperature measuring device based on infrared thermal imaging (also referred to as an infrared thermal imaging temperature measurement device). The infrared thermal imaging temperature measuring device may realize long-distance, multi-target and non-contact temperature detection. The device for temperature measurement 130 may include at least one temperature sensor, which may sense the temperature of the objects 140. The details of the device for temperature measurement 130 may be found in FIG. 2.

The one or more objects 140 may include the humans, for example, adults, children, etc., animals (e.g., pets), or any other stuffs, or the like, or any combination thereof. In some embodiments, the height of one of the one or more objects 140 may be not limited. In some embodiments, the one or more objects 140 may be in various scenes, for example, bank, store, market, hotel, or the like, or any combination thereof.

The storage device 150 may store data and/or instructions. In some embodiments, the storage device 150 may store data obtained from the device for temperature measurement 130. In some embodiments, the storage device 150 may store data and/or instructions that the server 110 may execute or use to perform exemplary methods described in the present disclosure. In some embodiments, storage device 150 may include a mass storage, removable storage, a volatile read-and-write memory, a read-only memory (ROM), or the like, or any combination thereof. Exemplary mass storage may include a magnetic disk, an optical disk, solid-state drives, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 160 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the temperature measurement system 100 (e.g., the server 110, the device for temperature measurement 130). One or more components of the temperature measurement system 100 may access the data or instructions stored in the storage device 150 via the network 120. In some embodiments, the storage device 150 may be directly connected to or communicate with one or more components of the temperature measurement system 100 (e.g., the server 110, device for temperature measurement 130). In some embodiments, the storage device 150 may be part of the server 110.

In some embodiments, one or more components of the temperature measurement system 100 (e.g., the server 110, device for temperature measurement 130) may have permissions to access the storage device 150. In some embodiments, one or more components of the temperature measurement system 100 may calibrate information related to the objects when one or more conditions are met. For example, the server 110 may calibrate the temperature of an object after a calibration is completed.

FIG. 2A is a schematic diagram illustrating exemplary device for temperature measurement according to some embodiments of the present disclosure, FIG. 2B is a front view illustrating exemplary device for temperature measurement according to some embodiments of the present disclosure, FIG. 2C is a vertical view illustrating exemplary device for temperature measurement according to some embodiments of the present disclosure, and FIG. 2D is a right side view illustrating exemplary device for temperature measurement according to some embodiments of the present disclosure.

As illustrated in FIG. 2A-D, the device for temperature measurement 130 may include a screen 210, a blackbody 220, a connecting rod 230, an infrared thermal imaging device 240 and at least one processor 250. The infrared thermal imaging device 240 may include an infrared thermal imaging camera 241 and a visible light camera 242, and an acquisition direction of the infrared thermal imaging camera 241 may be the same as an acquisition direction of the visible light camera 242. The screen 210 may be installed on the infrared thermal imaging device 240 through the connecting rod 230, and the screen 210 may face the acquisition direction of the infrared thermal imaging camera 241. The blackbody 220 may be installed on the side of the screen 210 facing the infrared thermal imaging device 240, and the blackbody 220 may be located within the acquisition range of the infrared thermal imaging device 240.

In some embodiments, the front of the screen 210 may face a detection region of the infrared thermal imaging camera 241 and/or the visible light camera 242. In some embodiments, the blackbody 220 may be on the back of the screen 210, and a radiation surface of the blackbody 220 may face the infrared thermal imaging camera 241, the blackbody 220 may appear exactly at the top right corner of the angle of view measured by the infrared thermal imaging camera 241. In some embodiments, one side of the connecting rod 230 may be connected to the screen 210 and the blackbody 220 by screw fixing, the other side of the connecting rod 230 may be fixed on the infrared thermal imaging device 240 by screw fixing, and a reinforcing rod may be added on the connecting rod 230 to fix and support. In some embodiments, the infrared thermal imaging camera

241 may be a camera on the infrared thermal imaging device 240, the front of the infrared thermal imaging camera 241 may face the blackbody 220 and the object, and the top right corner of the temperature measurement angle may completely cover the blackbody 220. In some embodiments, the visible light camera 242 may be a camera on the infrared thermal imaging device 240, and the front of the visible light camera 242 may face the object, the infrared thermal imaging device 240 may be connected to the connecting rod 230 by screw fixing.

In some embodiments, the screen 210 may display text and/or animation information such as slogan, identity information, and temperature of the object. In some embodiments, the screen 210 may be light in weight. In some embodiments, the blackbody 220 may be configured to provide a specified temperature (also referred to as a base temperature, such as 35° C., 38° C., etc.) under a specified power. In some embodiments, the blackbody 220 may be light in weight. In some embodiments, the connecting rod 230 may play the role of connecting and supporting the screen 210, the blackbody 220 and the infrared thermal imaging device 240, and the structure may be firm and reliable. In some embodiments, the infrared thermal imaging camera 241 may be a camera for temperature measurement, which may display the temperature of all objects in the viewing angle and display the maximum temperature among the temperatures of the objects. In some embodiments, the visible light camera 242 may be an ordinary camera, which may automatically recognize the face for positioning and tracking. In some embodiments, the infrared thermal imaging device 240 may have the dual light fusion function of infrared thermal imaging and visible light, the infrared thermal imaging device 240 may use visible light to identify and track human faces and position the human faces in the infrared thermal imaging temperature measurement interface at the same time to automatically measure the temperature of the object, and finally display the temperature through the screen 210.

In some embodiments, the device for temperature measurement 130 may be an integrated device with a stable and simple structure, and there is the blackbody 220 in the device for temperature measurement 130 and has the function of real-time calibration of temperature. When the device for temperature measurement 130 works, there is no need to change any structure, and accurate measurement may be carried out directly.

The infrared thermal imaging camera 220 may be configured to measure a temperature (also referred to as an estimated temperature) of a target surface of the blackbody and a temperature (also referred to as an estimated temperature) of an object. The at least one processor 230 may be configured to calibrate the estimated temperature of the object based on the specified temperature and the estimated temperature of the target surface.

The blackbody 220 may be a physical body that absorbs almost all incident electromagnetic radiation (e.g., infrared radiation), regardless of frequency or angle of incidence. The blackbody 220 in thermal equilibrium may emit electromagnetic blackbody radiation, and the radiation may be emitted according to Planck's law, meaning that the radiation has a spectrum that is determined by the specified temperature alone, not by the body's shape or composition of the blackbody 220. In some embodiments, the blackbody 220 may be manufactured manually by selecting an appropriate cavity shape and the uniformity of the cavity may be strictly controlled to make the blackbody 220 provide the specified temperature. In some embodiments, the size and the weight of the blackbody 220 may not be limited in the present disclosure.

In some embodiments, the specified temperature may refer to an expected temperature provided by the blackbody. For example, the specified temperature may be 35° C.

In some embodiments, the specified temperature may be preset according to a normal temperature of the human body by operators. For example, the normal temperature of the human body may be 36.5° C., the operators may set the temperature floating up and down by 1° C. to 36.5° C. as the specified temperature, such as 36° C.

In some embodiments, the specified temperature may be obtained by determining the average temperature of the target surface of the blackbody. Specifically, the blackbody may be configured to select a preset count of the highest temperatures of different locations of the target surface of the blackbody 220, determine the average temperature of the highest temperatures, and designate the average temperature as the specified temperature. The preset count may be an integer greater than a threshold, such as 10. For example, the highest temperatures may include 34.9° C., 34.93° C., 34.95° C., 34.97° C., 35° C., 35° C., 35.03° C., 35.05° C., 35.07° C., 35.1° C., the average temperature of the 10 temperatures may be 35° C., thus the specified temperature may be 35° C.

Any object with temperature will emit infrared radiation, the infrared thermal imaging camera may be configured to receive the infrared emitted by the object to generated photoelectric information, process the photoelectric information of the infrared radiation, and finally convert the infrared radiation (or the photoelectric information) into numbers, signals, images, or the like.

In some embodiments, the infrared thermal imaging camera may obtain an infrared thermal image of the object, perform a grayscale processing on the infrared thermal image, and obtain a grayscale image of the infrared thermal image. The pixels in the grayscale may correspond to different parts of the object, specifically, the higher the temperature of the object, the larger the gray value of the pixels in the grayscale. The infrared thermal imaging camera may obtain the temperature of the object according to the pixels in the grayscale. The gray value may indicate the brightness of a pixel in the grayscale of the infrared thermal image obtained by the infrared thermal imaging camera, such as 0, 103, 255.

In some embodiments, since the target surface of the blackbody may be uneven, the temperature of the target surface of the blackbody 220 may be the highest temperature of all pixel points on the target surface of the blackbody. For example, the infrared thermal imaging camera may measure 5 temperatures on different locations of the uneven target surface of the blackbody, including 34.9° C., 34.93° C., 34.95° C., 34.97° C., 35° C., the highest temperature is 35° C., thus 35° C. is the temperature of the target surface.

In some embodiments, the temperature of the target surface may be measured by the infrared thermal imaging camera, and in particular, an infrared temperature sensor of the infrared thermal imaging camera.

In some embodiments, the object may include persons or objects with temperature. In some embodiments, the object may include human (such as adults, children) and/or animals (such as cats, dogs).

In some embodiments, the estimated temperature of the object may be the temperature of the object before calibration, such as 34.9° C., 34.93° C.

In some embodiments, the estimated temperature of the object may be measured by the infrared thermal imaging camera, and in particular, the infrared temperature sensor of the infrared thermal imaging camera.

The at least one processor 250 may be any unit/module that may calibrate the temperature of the object.

In some embodiments, the at least one processor 250 may be configured to calibrate the temperature of the object according to operations including: determining a gray value difference between a reference gray value corresponding to the specified temperature and an estimated gray value corresponding to the temperature of the target surface that is determined from an image of the blackbody 220 acquired by the infrared thermal imaging camera 241; determining a temperature difference between the specified temperature and the temperature of the target surface; determining a calibration value based on the gray value difference and the temperature difference; and calibrating the temperature of the object based on the calibration value. More descriptions for calibrating the temperature of the object may be found in FIG. 3.

In some embodiments, the at least one processor 250 may be configured to obtain a relationship between a reference temperature and a reference gray value corresponding to a standard blackbody at the reference temperature, and determine the reference gray value corresponding to the specified temperature based on the relationship and the specified temperature.

In some embodiments, the reference temperature may be a temperature within a temperature range, such as any temperature between –30° C.-70° C. In some embodiments, the temperature range may be the temperature measurement range of the device for measuring the temperature.

In some embodiments, the standard blackbody may refer to a blackbody configured to obtain the corresponding relationship between the reference gray value and the reference temperature before the device for temperature measurement 130 leaves the factory.

In some embodiments, the relationship between the reference temperature and the gray value corresponding to the standard blackbody at the reference temperature may reflect the connections and properties between the reference temperature and the gray value corresponding to the standard blackbody at the reference temperature. Specifically, the reference temperature may be determined based on the gray value corresponding to the standard blackbody at the reference temperature, and the gray value corresponding to the standard blackbody at the reference temperature may be related to the reference temperature. In some embodiments, the relationship may be linear or nonlinear.

In some embodiments, the calibration model may be configured to obtain the relationship between the reference temperature and the gray value corresponding to the standard blackbody at the reference temperature. Specifically, the calibration model may obtain the reference temperature by the gray value corresponding to the standard blackbody at the reference temperature and obtain the gray value corresponding to the standard blackbody at the reference temperature by the reference temperature.

In some embodiments, the calibration model may include a trained machine learning model. In some embodiments, the trained machine learning model may include neural networks, such as back propagation neural network, a rbf-radial basis function neural network, a perceptron neural network, or the like. In some embodiments, the calibration model may represent the relationship between the reference temperature and the gray value corresponding to the standard blackbody at the reference temperature.

In some embodiments, the calibration model may be obtained by obtaining a plurality of training samples, wherein each of at least a portion of the training samples includes a sample temperature and a corresponding label, wherein the label represents a gray value corresponding to the standard blackbody at the sample temperature and training a calibration model based on the plurality of the training samples. The details of obtaining the calibration model may be found in FIG. 5.

In some embodiments, the temperature of the object may be calibrated in real time. Specially, the temperature of the object may be calibrated in real-time when the object enters the measuring area.

In some embodiments, the at least one processor may be configured to calibrate the temperature of the object based on a distance between the blackbody and the infrared thermal imaging camera that does not satisfies a condition.

In some embodiments, the condition may include the distance between the blackbody and the infrared thermal imaging camera is beyond the preset distance range. For example, if the preset distance range is 2-5 meters, the distance less than 2 meters or the distance larger than 5 meters may indicate that the distance between the blackbody and the infrared thermal imaging camera does not satisfies the condition.

In some embodiments, the at least one processor 250 may be configured to calibrate the temperature of the object in response to determining that the temperature of the object is within a temperature range.

In some embodiments, the temperature range may refer to the temperature range beyond a standard temperature range. For example, if the standard temperature range for human is 36.5-37° C., the temperature of the object less than 36.5° C. and the temperature of the object larger than 37° C. may be the temperature range.

In some embodiments, the temperature range may be set by the operators.

In some embodiments, the at least one processor 250 may be configured to obtain images of multiple objects, perform image recognition by processing the images, and obtain an image recognition result. The image recognition result may represent a distance between each of the objects and the device for temperature measurement. The at least one processor 250 may calibrate the temperature of the object closest to the device for temperature measurement among the multiple objects based on the image recognition result.

In some embodiments, the images of at least one object may be static or dynamic images of the object. In some embodiments, the images may be in black and white or in color.

In some embodiments, the distance between the object and the device for temperature measurement may be obtained by performing the image recognition.

In some embodiments, the image recognition may be performed by processing the images based on a face recognition, especially the position coordinates of facial organ points.

In some embodiments, the image recognition result may represent the distance between the object and the device for temperature measurement, for example, the distance may be the distance of the object perpendicular to the device for temperature measurement, such as 1.5 meters, 3 meters.

In some embodiments, the at least one processor 250 may select the object closest to the device for temperature measurement, and calibrate the temperature of the selected object. For example, there are 3 objects, and the distance between the 3 objects and the device for temperature measurement are 1 meter, 2 meters, and 3 meters, thus the object with the distance of 1 meter from the device for temperature measurement may be selected.

In some embodiments, the blackbody may be movable, and the blackbody may be moved according to a position of the object. The details of moving the blackbody may be found in FIG. 4.

FIG. 3 is a flowchart illustrating an exemplary process for measuring the temperature according to some embodiments of the present disclosure. In some embodiments, the process 300 may be performed by the processing device 112 or any other processor (e.g., the processor 250 in FIG. 2 and/or the modules in FIG. 6). The process 300 in FIG. 3 may execute the set of instructions, and when executing the instructions, the processing device 112 or any other processor may be configured to perform the process 300. The operations of the illustrated process presented below are intended to be illustrative. In some embodiments, the process 300 may be accomplished with one or more additional operations not described and/or without one or more of the operations herein discussed. Additionally, the order in which the operations of the process illustrated in FIG. 3 and described below is not intended to be limiting.

In 310, a relationship between a reference temperature and a gray value difference may be obtained. In some embodiments, operation 310 may be performed by the processing device 112 (e.g., the calibration module 630) or the processor 250 in FIG. 2.

In some embodiments, the reference temperature may be the temperature measurement range of the device for temperature measurement. For example, the reference temperature may be −20° C.~60° C.

In some embodiments, the reference temperature may be divided into multiple temperature intervals. For example, the reference temperature may be divided into sections every 10° C.

In some embodiments, the reference temperature may be extended according to rules. For example, the reference temperature may be extended according to the highest temperature of a temperature range of the reference temperature. As another example, the reference temperature may be extended according to the lowest temperature of the temperature range of the reference temperature. As a further example, for the reference temperature −20° C.~60° C., the reference temperature may be extended according to the temperature −20° C. and the temperature 60° C.: −30° C.~−20° C., −20° C.~−10° C., −10° C.~0° C., 0° C.~10° C., 10° C.~−20° C., 20° C.~30° C., 30° C.~40° C., 40° C.~50° C., 50° C.~60° C., 60° C.~70° C.

In some embodiments, the gray value corresponding to the standard blackbody of the temperature of the interval end of the multiple temperature intervals may be measured by the device for temperature measurement. For example, the gray value corresponding to the standard blackbody of the temperature −20° C., −10° C., 0° C., 10° C., 20° C., 30° C., 40° C., 50° C., 60° C., 70° C. may be measured by the device for temperature measurement.

In some embodiments, the gray value difference may be determined by making a difference between the gray values of each two adjacent gray values. In some embodiments, the gray value difference corresponding to the lowest temperature in the multiple temperature intervals may be set to 0.

FIG. 7A is a schematic diagram illustrating an exemplary relationship between the reference temperature and the gray value difference according to some embodiments of the present disclosure. As shown in FIG. 7A, the gray difference corresponding to −30° C. may be set to 0, the gray value difference of each two adjacent gray values may be determined, and a relationship between the reference temperature and the gray value difference may be obtained. In some embodiments, a curve of the corresponding relationship between the reference temperature and the gray value difference may be obtained, and the gray value read by the device for temperature measurement may be converted into the temperature with this table each time.

In 320, the temperature difference between the specified temperature and the temperature of the target surface may be determined. In some embodiments, operation 320 may be performed by the processing device 112 (e.g., the calibration module 630) or the processor 250 in FIG. 2.

The temperature difference may be the difference between the specified temperature and the temperature of the target surface. For example, if the specified temperature is 35° C. and the temperature of the target surface is 34.8° C., thus the temperature difference is 35~34.8=0.2° C.

In 330, the calibration value based on the gray value difference and the temperature difference may be determined. In some embodiments, operation 330 may be performed by the processing device 112 (e.g., calibration module 630) or the processor 250 in FIG. 2.

In some embodiments, the calibration value may be an additional gray value that the estimated gray value corresponding to the temperature of the target surface needs to be adjusted.

In some embodiments, the temperature of the target surface of the blackbody may be $T_1$, the specified temperature may be $\overline{T}_0$, the gray value difference between $T_1$ and $\overline{T}_0$ may be the calibration value.

In some embodiments, when the temperature of the target surface of the blackbody is lower than the specified temperature, the calibration value may be determined by the specified temperature and the relationship between the reference temperature and the gray value difference. Specifically, the gray value difference may be determined by the relationship between the reference temperature and the gray value difference, a gray value difference of a unit temperature may be determined according to the temperature interval and the adjacent gray value difference corresponding to the specified temperature, the temperature difference between the specified temperature and the temperature of the target surface may be determined, and the calibration value may be determined according to the gray value difference and the temperature difference.

In some embodiments, the calibration value may be calculated by multiplying the gray value difference by the temperature difference.

In some embodiments, the gray value difference interval of the specified temperature $\overline{T}_0$ may be determined, for example, the specified temperature $\overline{T}_0$ is in the range 30° C.~40° C., the gray value difference interval of the specified temperature $\overline{T}_0$ may be in $G_{40}$, and the gray value difference of every 10° C. may be $G_{40}$, thus the calibration value for each 1° C. may be $$\frac{G_{40}}{10},$$

and the total calibration value may be $$(\overline{T}_0 - T_1)\frac{G_{40}}{10}.$$

In 340, an estimated temperature of the object may be calibrated based on the calibration value. In some embodiments, operation 340 may be performed by the processing device 112 (e.g., calibration module 630) or the processor 250 in FIG. 2.

In some embodiments, each adjacent gray difference $G_{−20}$, $G_{−10}$, $G_0$, $G_{10}$, $G_{20}$, $G_{30}$, $G_{40}$, $G_{50}$, $G_{60}$, and $G_{70}$ may be increased by $$(\overline{T}_0 - T_1)\frac{G_{40}}{10},$$

the temperature of the target surface may be changed from $T_1$ to $T_2$ after a period of time (one frame or several frames) from the last measurement, and then the temperature of the object may be calibrated by $$(\overline{T}_0 - T_2)\frac{G_{40}}{10},$$

finally the temperature of the target surface $T_n$ may be the same as the specified temperature $\overline{T}_0$ in this way, that is, the function of real-time calibration may be achieved.

The following descriptions take an example of the specified temperature of 35° C. FIGS. 7B-C are schematic diagrams illustrating an exemplary relationship between the reference temperature and the gray value difference according to some embodiments of the present disclosure, as shown in FIG. 7B, the blackbody may be turned on to provide the specified temperature 35° C., the specified temperature provided by the blackbody may be 35° C. theoretically, however, the actual specified temperature may be affected by non-uniformity, thus 10 pixel points on the target surface of the blackbody may be selected: 34.9° C., 34.93° C., 34.95° C., 34.97° C., 35° C., 35° C., 35.03° C., 35.05° C., 35.07° C., 35.1° C., the average temperature of the 10 temperatures is 35° C., thus the specified temperature may be 35° C., and the temperature of the target surface may be 34.8° C. The adjacent gray value difference at the specified temperature of 35° C. may be 448, the gray value difference of every 10° C. may be 448, thus the calibration value for each 1° C. may be 448/10 and the total calibration value may be $$(35 - 34.8) * \frac{448}{10} = 8.96,$$

each adjacent gray value difference (except −30° C.) may be increased by 8.96, and the updated relationship between the reference temperature and the gray value difference may be shown in FIG. 7C.

The device for temperature measurement provided by the embodiments of this present disclosure not only explains the principle, but also describes the compensation algorithm and process in detail to ensure the measurement accuracy in real-time, but also selects the average temperature of multiple highest temperatures on the target surface of the blackbody on time to further ensure the accuracy. The device for temperature measurement has real-time calibration function before and after leaving the factory, no matter how the device is used, the measurement accuracy will not produce large errors. Moreover, the device for temperature measurement may be an integrated device with stable and simple structure. There is a blackbody in the device, which has the function of real-time calibration of the reference temperature. When the equipment works, there is no need to change any structure, and accurate measurement may be carried out directly. At the same time, the device may ensure the stability and the accuracy of the temperature measurement without human participation and changing any structure in the whole measurement process, reduce the measurement cost and improve the measurement efficiency. It is suitable for various working environments. Moreover, the production cost is low and suitable for large-scale production.

It should be noted that the above description of the processing 300 provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure.

FIGS. 4A-4B are schematic diagrams illustrating the movable blackbody according to some embodiments of the present disclosure.

In some embodiments, in order to measure the temperature easily, the blackbody may be placed on the side close to the object or other suitable positions.

In some embodiments, the blackbody may be movable. In some embodiments, the blackbody may be moved by the operators manually or automatically. For example, the blackbody may be moved by a moving device, such as a cart, the operator may place the blackbody on the cart and push the blackbody to a suitable position.

In some embodiments, the blackbody may be moved according to the position of the object. In some embodiments, the position of the object may represent the position of the object when the temperature of the object is measured, for example, when the image of the object is acquired for temperature measurement.

Specially, the blackbody may be moved so that the position of the blackbody reaches a position symmetrical to the object. The position symmetrical to the object may indicate that the object and the blackbody are symmetrical to an axis (e.g., the vertical axis) of the device for measuring the temperature. As illustrated in FIG. 4A-B, the dotted lines may indicate the axis of the device for measuring the temperature, and the object may be symmetrical to the temperature, and the object may be symmetrical to the blackbody based on the axis.

In some embodiments, the operators may measure the distance between the object and the axis of the device for temperature measurement, and then move the blackbody so that the position of the blackbody reaches the position symmetrical to the object.

Figure 5:
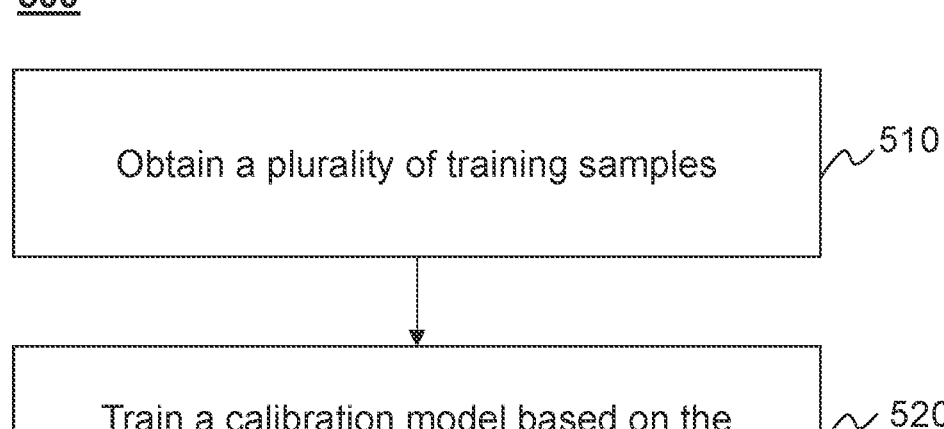
FIG. 5 is a flowchart illustrating an exemplary process for training a calibration model according to some embodiments of the present disclosure.

FIG. 5 is a flowchart illustrating an exemplary process for obtaining the calibration model according to some embodiments of the present disclosure. In some embodiments, the process 500 may be performed by the processing device 112 or any other processor (e.g., the processor 250 in FIG. 2). The process 500 in FIG. 5 may execute the set of instructions, and when executing the instructions, the processing device 112 or any other processor may be configured to perform the process 500. The operations of the illustrated process presented below are intended to be illustrative. In some embodiments, the process 500 may be accomplished with one or more additional operations not described and/or without one or more of the operations herein discussed. Additionally, the order in which the operations of the process illustrated in FIG. 5 and described below is not intended to be limiting.

In 510, the plurality of the training samples may be obtained.

In some embodiments, each of at least a portion of the training samples may include a sample temperature and a corresponding label.

In some embodiments, the sample temperature may include a plurality of temperatures. For example, the sample temperature may be the temperatures at the same interval, such as −30° C., −20° C., −10° C., 0° C. and 10° C. For another example, the sample temperature may be a range of temperatures, such as 30° C.-70° C.

In some embodiments, the label may represent a gray value of a pixel corresponding to the standard blackbody in an image acquired by the at least one processor when the standard blackbody is at the sample temperature. For example, the gray value of the pixel corresponding to the standard blackbody at the sample temperature −30° C. may be 0, and the gray value of the pixel corresponding to the standard blackbody at the sample temperature −20° C. may be 103.

In 520, a preliminary calibration model may be trained based on the plurality of the training samples. As used herein, the preliminary calibration model may be a prior calibration model that has been trained using a training set including at least one training sample different from the plurality of the training samples or a machine learning model that has been not trained using any training samples.

In some embodiments, the preliminary calibration model may be trained based on the plurality of the training samples with labels. Specifically, the plurality of the labeled training samples with labels may be input into the calibration model, and the parameters of the calibration model may be updated by training.

In some embodiments, the labels may be the gray value of the pixel corresponding to the standard blackbody in the image acquired by the at least one processor when the standard blackbody is at the sample temperature, such as 103, 161.

In some embodiments, the labels may be obtained by manually setting the temperature of the blackbody.

In some embodiments, when the training calibration model meets the preset conditions, the training may end. The preset condition may be that the result of the loss function converges or is less than the preset threshold.

Figure 6:
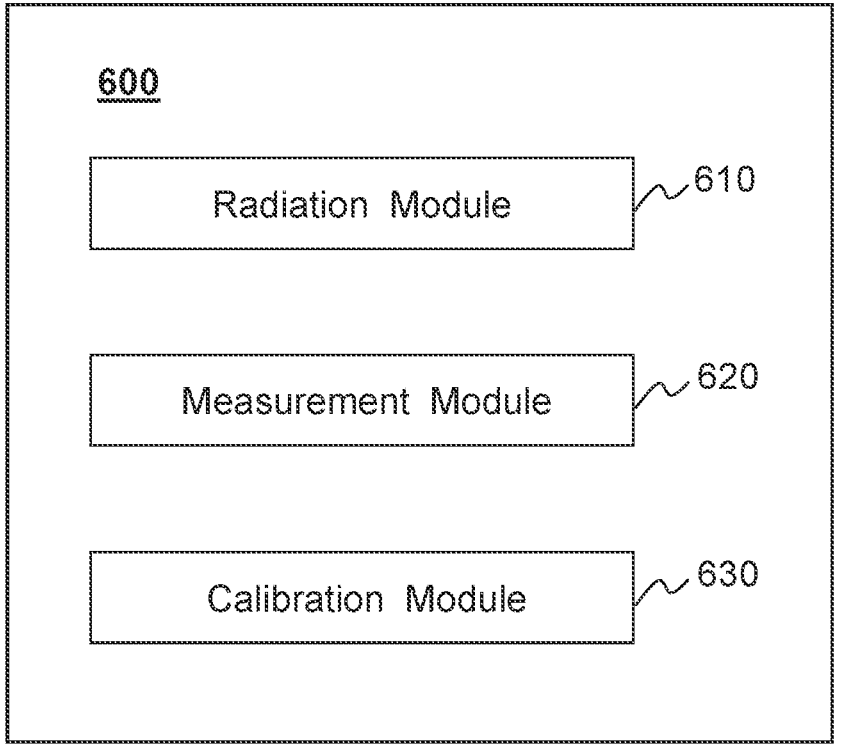
FIG. 6 is a block diagram illustrating an exemplary temperature measurement system according to some embodiments of the present disclosure.

FIG. 6 is a block diagram illustrating an exemplary temperature measurement system according to some embodiments of the present disclosure. As shown in FIG. 6, the system 600 may include a radiation module 610, a measurement module 620, and a calibration module 630.

In some embodiments, the radiation module 610 may be configured to provide and/or obtain a specified temperature provided by a blackbody. In some embodiments, the radiation module 610 may be configured to obtain the specified temperature provided by the blackbody as described elsewhere in the present disclosure.

In some embodiments, the measurement module 620 may be configured to obtain the temperature of a target surface of the blackbody and the temperature of the object. In some embodiments, the measurement module 610 may obtain the temperature of a target surface of the blackbody and the temperature of the object detected by the device for temperature measurement described elsewhere in the present disclosure.

In some embodiments, the calibration module 630 may be configured to calibrate the temperature of the object based on the specified temperature and the temperature of the target surface.

In some embodiments, the calibration module 630 may be configured to calibrate the temperature of the object according to operations including determining the gray value difference between the reference gray value corresponding to the specified temperature and the estimated gray value corresponding to the temperature of the target surface that is determined from the image of the blackbody acquired by the infrared thermal imaging camera, determining the temperature difference between the specified temperature and the temperature of the target surface, determining the calibration value based on the gray value difference and the temperature difference, and calibrating the temperature of the object based on the calibration value.

In some embodiments, the calibration module 630 may be configured to obtain the relationship between the reference temperature and the gray value corresponding to the standard blackbody at the reference temperature, and determine the reference gray value corresponding to the specified temperature based on the relationship and the specified temperature.

In some embodiments, the calibration module 630 may be configured to obtain the relationship using the calibration model, wherein the calibration model includes the trained machine learning model.

In some embodiments, the calibration module 630 may be obtained according to operations including obtaining the plurality of training samples, wherein each of at least the portion of the training samples includes the sample temperature and the corresponding label, wherein the label represents the gray value corresponding to the standard blackbody at the sample temperature, and training a calibration model based on the plurality of the training samples.

In some embodiments, the calibration module 630 may be configured to calibrate the temperature of the object in real-time.

In some embodiments, the calibration module 630 may be configured to calibrating the temperature of the object based on the distance between the blackbody and the infrared thermal imaging camera that does not satisfies the condition.

In some embodiments, the calibration module 630 may be configured to calibrating the temperature of the object in response to determining that the temperature of the object is within the temperature range.

In some embodiments, the calibration module 630 may be configured to obtain the images of at least one object, perform image recognition by processing the images and obtaining the image recognition result, wherein the image recognition result represents the distance between the object and the device for temperature measurement, and calibrate the temperature of the object closest to the device for temperature measurement based on the image recognition result.

The modules in the system 600 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the radiation module 610 and the measurement module 620 are combined as a single module which is configured to obtain the location parameter and the orientation parameter associated with the device. As another example, the system 600 includes a storage module (not shown) which is used to store data generated by the above-mentioned modules.

It should be noted that the above description of the processing 500 provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the features, structures or characteristics may be combined as suitable in one or more embodiments of the present disclosure.

Further, it will be appreciated by one skilled in the art, aspects of the present disclosure may be illustrated and described herein in any of a count of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "device," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be preset in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A device for temperature measurement, comprising:
a blackbody configured to provide a specified temperature;
an infrared thermal imaging camera configured to measure a temperature of a target surface of the blackbody and a temperature of an object; and
at least one processor configured to calibrate the temperature of the object based on the specified temperature and the temperature of the target surface according to operations including:
obtaining a relationship between a reference temperature and a gray value difference;
determining a temperature difference between the specified temperature and the temperature of the target surface;
determining a calibration value based on the gray value difference and the temperature difference; and
calibrating the temperature of the object based on the calibration value.

2. The device of claim 1, wherein the at least one processor is further configured to:
determine the gray value difference corresponding to a standard blackbody at the reference temperature.

3. The device of claim 2, wherein the at least one processor is further configured to:
obtain the relationship using a calibration model, wherein the calibration model includes a trained machine learning model.

4. The device of claim 3, wherein the calibration model is obtained according to operations including:
obtaining a plurality of training samples, wherein each of at least a portion of the training samples includes a sample temperature and a corresponding label, wherein the label represents a gray value corresponding to the standard blackbody at the sample temperature;
training a calibration model based on the plurality of the training samples.

5. The device of claim 1, wherein the at least one processor is further configured to:
calibrate the temperature of the object in real-time.

6. The device of claim 1, wherein the at least one processor is further configured to:
calibrate the temperature of the object based on a distance between the blackbody and the infrared thermal imaging camera that does not satisfy a condition.

7. The device of claim 1, wherein the at least one processor is further configured to:
calibrate the temperature of the object in response to determining that the temperature of the object is within a temperature range.

8. The device of claim 1, wherein the at least one processor is further configured to:
obtain images of at least one object;
perform image recognition by processing the images and obtaining an image recognition result, wherein the image recognition result represents a distance between the object and the device for temperature measurement;
calibrate the temperature of the object closest to the device for temperature measurement based on the image recognition result.

9. The device of claim 1, wherein the blackbody is movable, and the blackbody is moved according to a position of the object.

10. A method for temperature measurement, implemented on a computing device having at least one processor and at least one storage device, the method comprising:
obtaining a specified temperature provided by a blackbody;
obtaining a temperature of a target surface of the blackbody and a temperature of an object detected by a device for temperature measurement; and
calibrating the temperature of the object based on the specified temperature and the temperature of the target surface according to operations including:
obtaining a relationship between a reference temperature and a gray value difference;
determining a temperature difference between the specified temperature and the temperature of the target surface;
determining a calibration value based on the gray value difference and the temperature difference; and
calibrating the temperature of the object based on the calibration value.

11. The method of claim 10, further comprising:
determining the gray value difference corresponding to a standard blackbody at the reference temperature.

12. The method of claim 11, further comprising:

obtaining the relationship using a calibration model, wherein the calibration model includes a trained machine learning model.

13. The method of claim 12, wherein the calibration model is obtained according to operations including:

obtaining a plurality of training samples, wherein each of at least a portion of the training samples includes a sample temperature and a corresponding label, wherein the label represents a gray value corresponding to the standard blackbody at the sample temperature;

training a calibration model based on the plurality of the training samples.

14. The method of claim 10, further comprising:

calibrating the temperature of the object in real-time.

15. The method of claim 10, further comprising:

calibrating the temperature of the object based on a distance between the blackbody and the infrared thermal imaging camera that does not-satisfies satisfy a condition.

16. The method of claim 10, further comprising:

calibrating the temperature of the object in response to determining that the temperature of the object is within a temperature range.

17. The method of claim 10, wherein further comprising:

obtaining images of at least one object;

performing image recognition by processing the images and obtaining an image recognition result, wherein the image recognition result represents a distance between the object and the device for temperature measurement;

calibrating the temperature of the object closest to the device for temperature measurement based on the image recognition result.

18. A system for temperature measurement, comprising:

at least one storage device including a set of instructions; and at least one processor configured to communicate with the at least one storage device, wherein when executing the set of instructions, the at least one processor is configured to direct the system to perform operations including:

obtaining a specified temperature provided by a blackbody;

obtaining a temperature of a target surface of the blackbody and a temperature of an object detected by a device for temperature measurement; and calibrating the temperature of the object based on the specified temperature and the temperature of the target surface according to operations including:

obtaining a relationship between a reference temperature and a gray value difference;

determining a temperature difference between the specified temperature and the temperature of the target surface;

determining a calibration value based on the gray value difference and the temperature difference; and calibrating the temperature of the object based on the calibration value.

* * * * *